(12) United States Patent
Su et al.

(10) Patent No.: US 8,199,266 B2
(45) Date of Patent: Jun. 12, 2012

(54) PIXEL STRUCTURE, DRIVING METHOD THEREOF, PIXEL ARRAY STRUCTURE, AND LIQUID CRYSTAL DISPLAY PANEL

(75) Inventors: Jenn-Jia Su, Hsinchu (TW); Ting-Wei Su, Hsinchu (TW); Wen-Hao Hsu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 1094 days.

(21) Appl. No.: 12/049,361

(22) Filed: Mar. 16, 2008

(65) Prior Publication Data
US 2009/0096945 A1 Apr. 16, 2009

(30) Foreign Application Priority Data
Oct. 16, 2007 (TW) .............................. 96138669 A

(51) Int. Cl.
*G02F 1/1343* (2006.01)
(52) U.S. Cl. .............. 349/39; 349/144; 349/41; 349/38; 349/43
(58) Field of Classification Search .................. 349/39, 349/144, 41, 38, 43
See application file for complete search history.

(56) References Cited

U.S. PATENT DOCUMENTS

| | | | | |
|---|---|---|---|---|
| 7,605,885 B2 * | 10/2009 | Ina et al. | ........................ | 349/106 |
| 7,791,676 B2 * | 9/2010 | Kubo et al. | ........................ | 349/38 |
| 2004/0164942 A1 | 8/2004 | Shih et al. | | |
| 2004/0233343 A1 * | 11/2004 | Baek | ........................ | 349/38 |
| 2005/0122441 A1 | 6/2005 | Shimoshikiryoh | | |
| 2005/0219186 A1 | 10/2005 | Kamada et al. | | |
| 2006/0097972 A1 * | 5/2006 | Takeuchi et al. | ........................ | 345/90 |
| 2006/0146243 A1 * | 7/2006 | Nakanishi et al. | ........................ | 349/139 |
| 2006/0262237 A1 * | 11/2006 | Chen et al. | ........................ | 349/38 |
| 2008/0024689 A1 * | 1/2008 | Ahn | ........................ | 349/43 |
| 2008/0055506 A1 * | 3/2008 | Huang et al. | ........................ | 349/41 |

FOREIGN PATENT DOCUMENTS
TW I287685 10/2007

OTHER PUBLICATIONS
"Office Action of Taiwan Counterpart Application", issued on May 19, 2010, p. 1-p. 6.

* cited by examiner

*Primary Examiner* — Edward Glick
*Assistant Examiner* — Sang Nguyen
(74) *Attorney, Agent, or Firm* — Jianq Chyun IP Office

(57) ABSTRACT

A pixel structure electrically connected to a data line and a scan line, and including a first and a second active device, a first and a second pixel electrode, and a first and a second capacitance electrode is provided. The first pixel electrode electrically connected to the first active device includes a first and a second electrode block electrically connected to each other. The second pixel electrode electrically connected to the second active device is electrically insulated from the first pixel electrode and separates the first and the second electrode block. The first pixel electrode respectively forms a first and a second capacitor with the first and the second capacitance electrode. The second pixel electrode respectively forms a third and a fourth capacitor with the first and the second capacitance electrode. The first and the second capacitor have different capacitances. The third and the fourth capacitor have different capacitances.

16 Claims, 11 Drawing Sheets

US 8,199,266 B2

PIXEL STRUCTURE, DRIVING METHOD THEREOF, PIXEL ARRAY STRUCTURE, AND LIQUID CRYSTAL DISPLAY PANEL

CROSS-REFERENCE TO RELATED APPLICATION

This application claims the priority benefit of Taiwan application serial no. 96138669, filed on Oct. 16, 2007. The entirety the above-mentioned patent application is hereby incorporated by reference herein and made a part of specification.

BACKGROUND OF THE INVENTION

1. Field of the Invention

The present invention generally relates to a pixel structure, a driving method thereof, a pixel array structure, in particular and a liquid crystal display panel, to a pixel structure, a driving method thereof, a pixel array structure and a liquid crystal display panel having good display quality.

2. Description of Related Art

Thin film transistor liquid crystal display (TFT-LCD) has gradually become the mainstream in today's display market due to its characteristics such as high display quality, high space efficiency, low power consumption, and no radiation. Presently, the design of LCD is going towards high contrast ratio, rapid response, and wide viewing angle, wherein multi-domain vertically alignment (MVA)-LCD and in-plate switching (IPS) LCD are usually adopted to achieve wide-viewing angle display.

Even though wide-viewing angle display can be achieved by a MVA-LCD, color washout, namely, color shift, is usually produced in an image displayed by the MVA-LCD when a user looks at the image from a large viewing angle. FIG. 1 is a graph illustrating various $\gamma$ (gamma) curves observed from different viewing angles ($\theta$) of a conventional MVA LCD. Referring to FIG. 1, the ordinate axis represents transmittance, and the abscissa axis represents gray level, wherein the curve having $\gamma=2.2$ is an ideal curve. As shown in FIG. 1, the larger the viewing angle is (for example, $\theta=60°$), the more the $\gamma$ curve is deformed, namely, the further the $\gamma$ curve is away from the ideal curve. To be specific, color shift will be produced in an image viewed from a large viewing angle because the image has high luminance at medium to low gray level from the large viewing angle. An existing method for reducing color shift is to align liquid crystal molecules at many different angles and divide each pixel into two sub display regions having different display voltages.

FIG. 2 is an equivalent circuit diagram of a conventional pixel structure with color washout solution. Referring to FIG. 2, the pixel structure 100 is electrically connected to a data line 102 and a scan line 104. The pixel structure 100 includes a first active device 110, a second active device 112, a first capacitance electrode 114, a second capacitance electrode 116, a first pixel electrode 120, and a second pixel electrode 130. The first pixel electrode 120 and the second pixel electrode 130 are respectively connected to the first active device 110 and the second active device 112 electrically. The first capacitance electrode 114 and the second capacitance electrode 116 respectively have a specific voltage level. Thus, the first pixel electrode 120 and the second pixel electrode 130 have different display voltages due to the capacitance coupling effect thereof with respectively the first capacitance electrode 114 and the second capacitance electrode 116. Accordingly, at medium to low gray level, one of the regions of the first pixel electrode 120 and the second pixel electrode 130 can have low luminance, while at high gray level, both the regions of the first pixel electrode 120 and the second pixel electrode 130 can have similar luminance. As a result, color shift produced at large viewing angle is restrained in the pixel structure 100.

However, the first pixel electrode 120 and the second pixel electrode 130 have to be arranged in a lattice pattern since they have to be disposed corresponding to capacitance electrodes (114 and 116) having different voltage levels, so that when the pixel structure 100 is provided in an LCD, images displayed in the LCD may look coarse-grained. Thereby, the display quality of the pixel structure 100 is still unsatisfactory.

SUMMARY OF THE INVENTION

Accordingly, the present invention is directed to a pixel structure in order to resolve the problem of coarseness in a displayed image caused by pixel electrodes arranged in a lattice pattern.

The present invention is directed to a driving method for improving the display quality of a pixel structure.

The present invention is also directed to a pixel array structure which can be applied in a liquid crystal display (LCD) and improve the display quality of the LCD.

The present invention is also directed to a liquid crystal display (LCD) having good displaying quality.

The present invention provides a pixel structure electrically connected to a data line and a scan line. The pixel structure includes a first active device, a second active device, a first pixel electrode, a second pixel electrode, a first capacitance electrode, and a second capacitance electrode. The first pixel electrode electrically connected to the first active device includes a first electrode block and a second electrode block electrically connected to each other. The second pixel electrode electrically connected to the second active device is electrically insulated from the first pixel electrode. The second pixel electrode electrically insulates the first electrode block and the second electrode block. The first pixel electrode respectively forms a first capacitor and a second capacitor with the first capacitance electrode and the second capacitance electrode, and the second pixel electrode respectively forms a third capacitor and a fourth capacitor with the first capacitance electrode and the second capacitance electrode. The first capacitor and the second capacitor have different capacitances, and the third capacitor and the fourth capacitor have different capacitances.

The present invention also provides a pixel array structure including a plurality of scan lines, a plurality of data lines, a plurality of first active devices, a plurality of second active devices, a plurality of first pixel electrodes, a plurality of second pixel electrodes, a plurality of first capacitance electrodes, and a plurality of second capacitance electrodes. The data lines and the scan lines intersect with each other to define a plurality of pixel regions. The first active devices and the second active devices are electrically connected to the data lines and the scan lines. The first pixel electrodes are electrically connected to the first active devices and are disposed in the pixel regions. Each of the first pixel electrodes includes a first electrode block and a second electrode block electrically connected to each other. The second pixel electrodes electrically connected to the second active devices are disposed in the pixel regions and are electrically insulated from the first pixel electrodes. The second pixel electrodes separate the first electrode blocks and the second electrode blocks. The second capacitance electrodes are disposed between the first capacitance electrodes and the scan lines. Each of the first capacitance electrodes and each of the second capacitance electrodes have different patterns in adjacent pixel regions.

According to an embodiment of the present invention, the capacitance of the first capacitor is greater than the capacitance of the second capacitor.

According to an embodiment of the present invention, the capacitance of the third capacitor is smaller than the capacitance of the fourth capacitor.

According to an embodiment of the present invention, the capacitance of the first capacitor is smaller than the capacitance of the second capacitor.

According to an embodiment of the present invention, the capacitance of the third capacitor is greater than the capacitance of the fourth capacitor.

According to an embodiment of the present invention, the first pixel electrode further includes a connecting portion disposed between the first electrode block and the second electrode block and electrically connecting the two. The material of the connecting portion is metal or a transparent conductive material.

According to an embodiment of the present invention, the first electrode block and the second electrode block are in approximately triangular or rectangular shape.

According to an embodiment of the present invention, the second pixel electrode includes a central electrode block and a first end electrode block and a second end electrode block respectively connected to two ends of the central electrode block. The central electrode block may be disposed between the first electrode block and the second electrode block of the first pixel electrode.

The present invention further provides a liquid crystal display (LCD) panel. The LCD panel comprises an array substrate, an opposite substrate and a liquid crystal layer. The array substrate has a plurality of the abovementioned pixels. The opposite substrate is disposed opposite to the array substrate. The liquid crystal layer is disposed between the array substrate and the opposite substrate.

The present invention further provides a driving method suitable for driving a pixel structure. In the driving method, a first voltage is provided to a first capacitance electrode, and a second voltage is provided to a second capacitance electrode, wherein the first voltage is different from the second voltage so that the luminance in the region of the first pixel electrode is made different from the luminance in the region of the second pixel electrode.

According to an embodiment of the present invention, the difference between the first voltage and the second voltage is higher than 0V and lower than 20V.

According to an embodiment of the present invention, the driving method further includes providing an image data signal to the first pixel electrode and the second pixel electrode.

In the present invention, the first pixel electrodes and the second pixel electrodes having different display voltages are arranged evenly so that when the pixel array structure provided by the present invention is applied in an LCD, coarseness in lattice pattern is not produced in images displayed by the LCD and accordingly the display quality of the LCD is improved. Moreover, in the present invention, the first pixel electrodes and the second pixel electrodes are disposed along with different patterns of capacitance electrodes so that the display voltages of the pixel electrodes can be adjusted or changed according to different design requirement.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
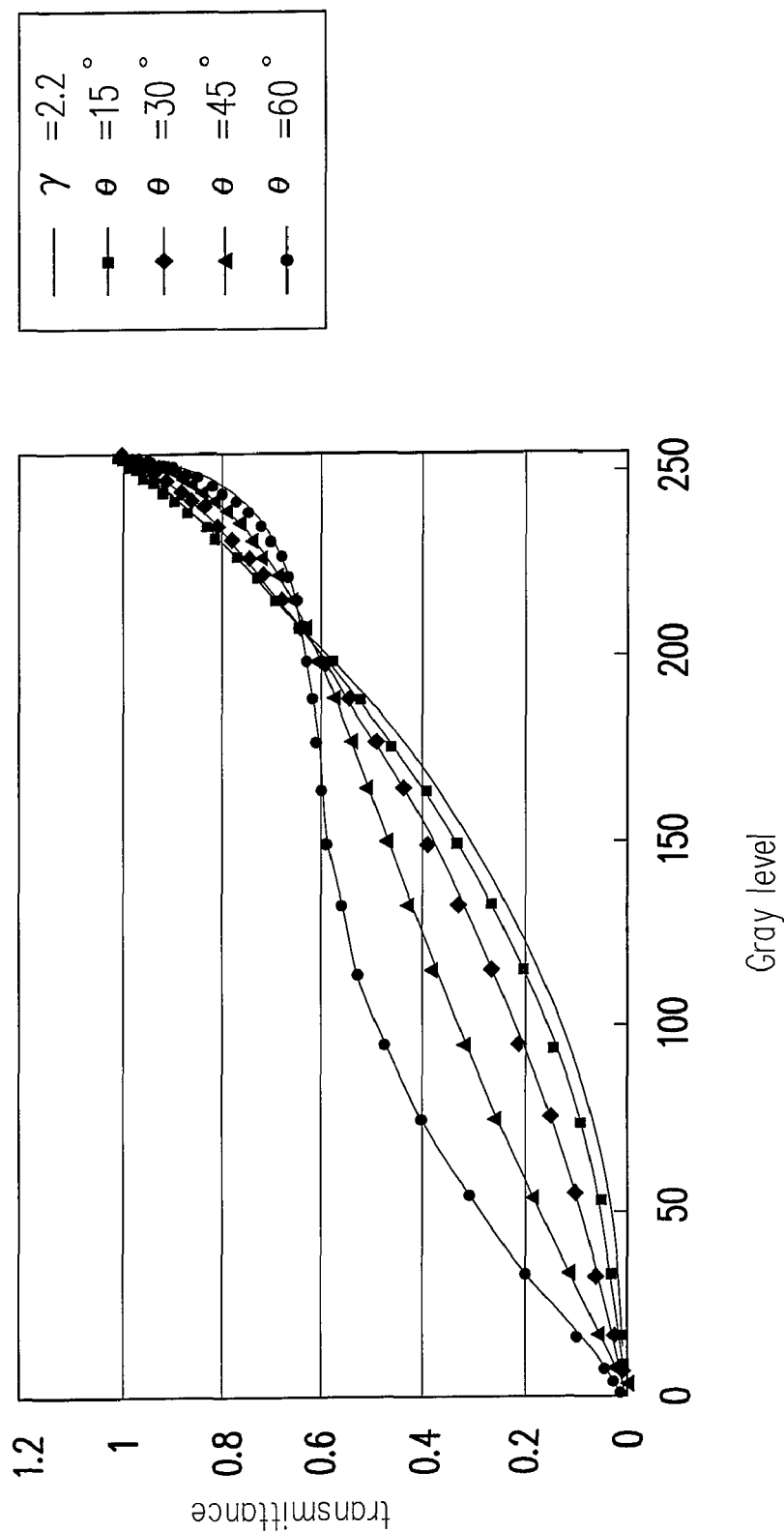
FIG. 1 is a graph illustrating various γ curves observed from different viewing angles of a conventional multi-domain vertically alignment (MVA) liquid crystal display (LCD).
Figure 2:
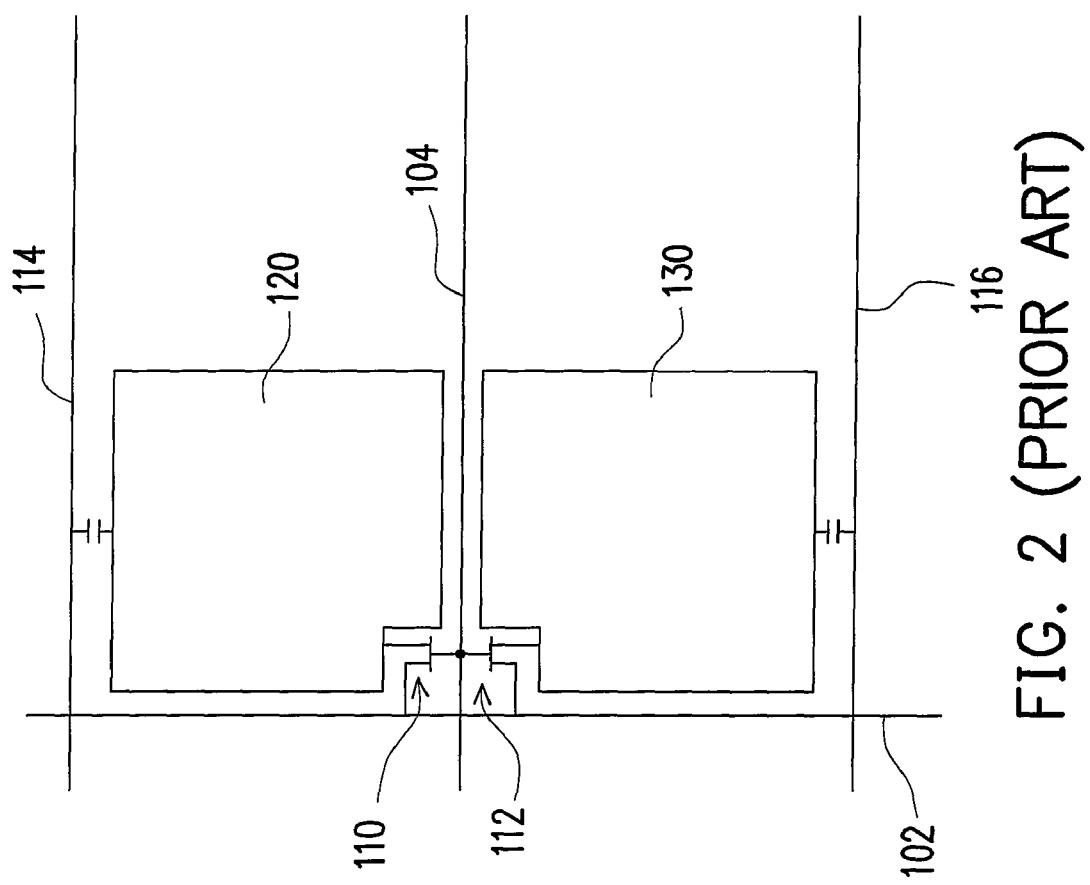
FIG. 2 is an equivalent circuit diagram of a conventional pixel structure.

Reference will now be made in detail to the present preferred embodiments of the invention, examples of which are illustrated in the accompanying drawings. Wherever possible, the same reference numbers are used in the drawings and the description to refer to the same or like parts.

Figure 3A:
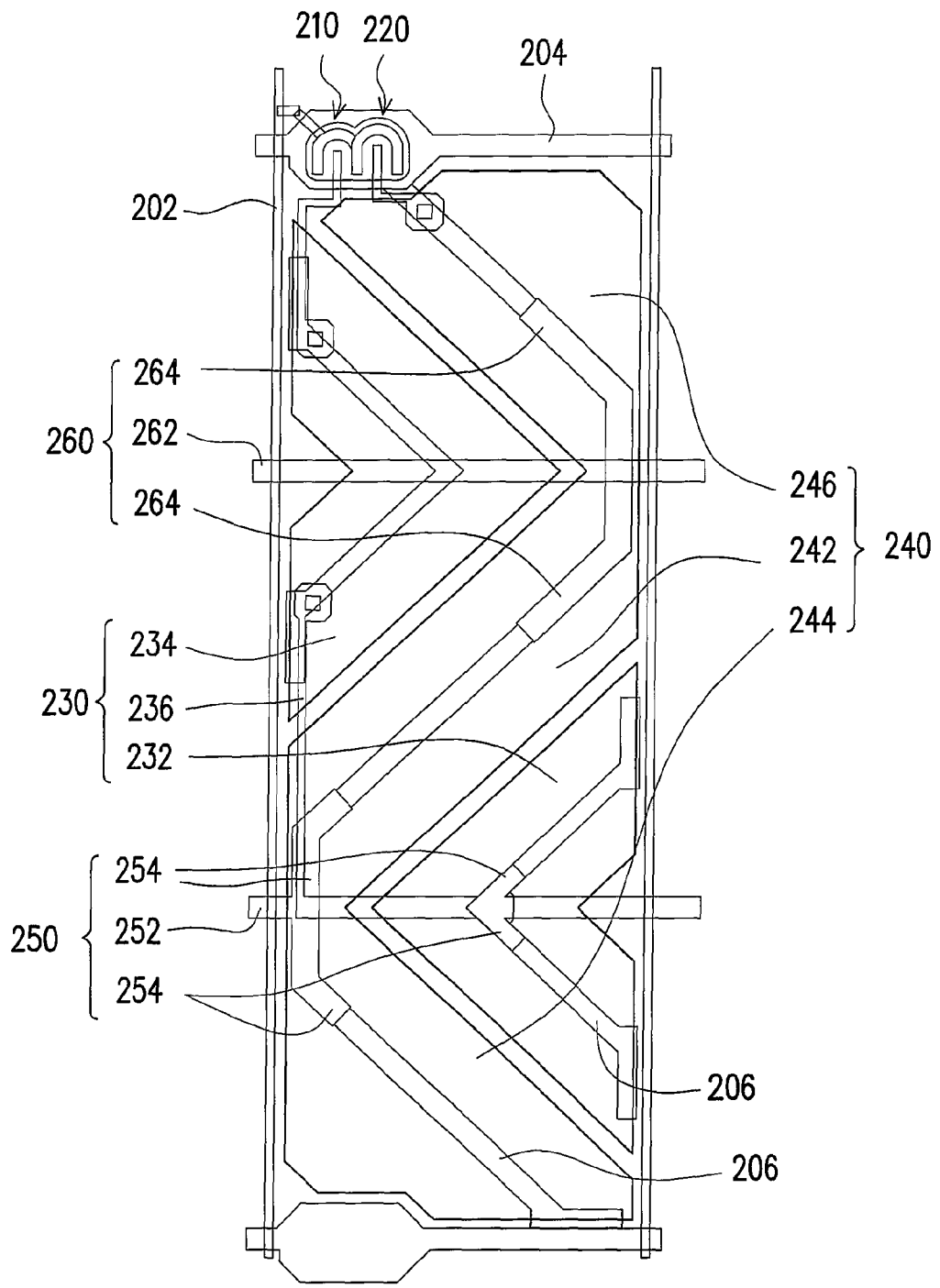
FIG. 3A is a schematic view of a pixel structure according to an embodiment of the present invention.
Figure 3B:
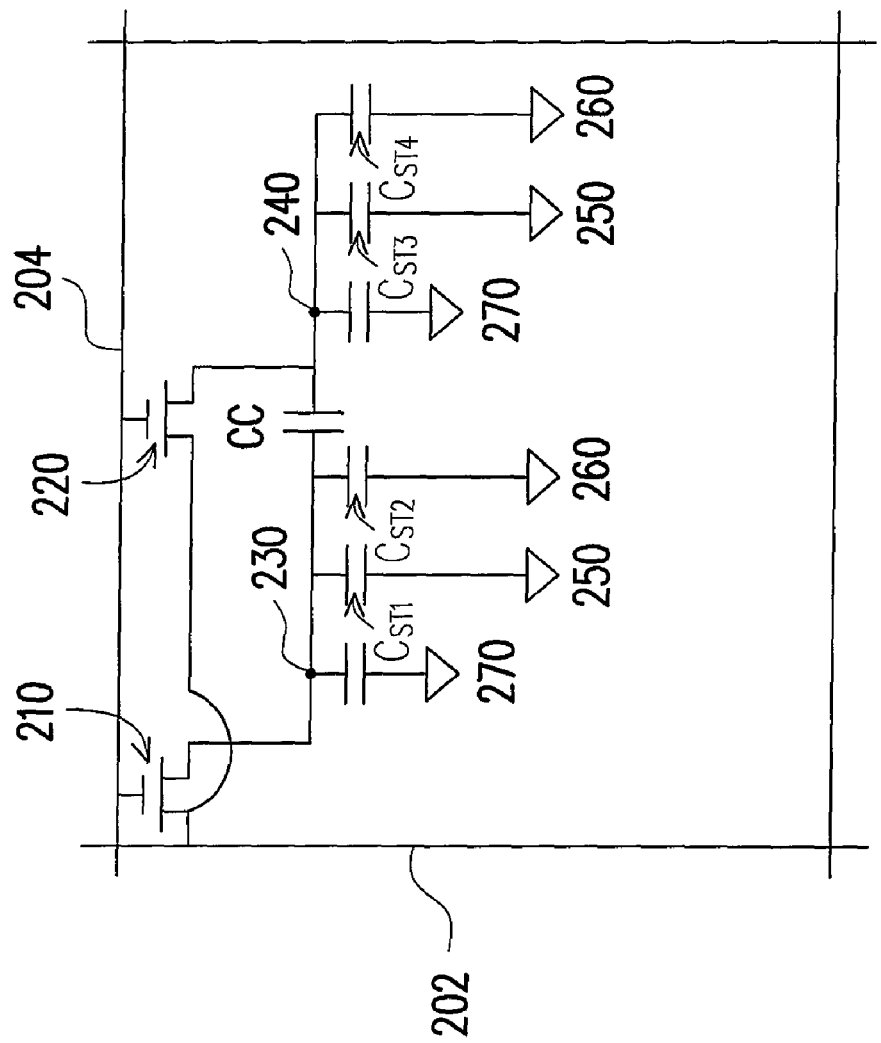
FIG. 3B is an equivalent circuit diagram of a pixel structure according to an embodiment of the present invention.

FIG. 3A is a schematic view of a pixel structure according to an embodiment of the present invention, and FIG. 3B is an equivalent circuit diagram of a pixel structure according to an embodiment of the present invention. Referring to FIG. 3A and FIG. 3B, the pixel structure 200 is electrically connected to a data line 202 and a scan line 204, and the pixel structure 200 includes a first active device 210, a second active device 220, a first pixel electrode 230, a second pixel electrode 240, a first capacitance electrode 250, and a second capacitance electrode 260. The first pixel electrode 230 is electrically connected to the first active device 210, and the first pixel electrode 230 includes a first electrode block 232 and a second electrode block 234 which are electrically connected to each other. The second pixel electrode 240 is electrically connected to the second active device 220 and is electrically insulated from the first pixel electrode 230. The second pixel electrode 240 may spatially separate the first electrode block 232 and the second electrode block 234.

When the pixel structure 200 is applied in a liquid crystal display (LCD) for displaying images, color shift produced at large viewing angles can be reduced because the first pixel electrode 230 and the second pixel electrode 240 have different display voltages. Additionally, in the present embodiment, the first pixel electrode 230 and the second pixel electrode 240 in the pixel structure 200 are further disposed in a staggered way so that the coarseness in a displayed image caused by pixel electrodes arranged in lattice pattern can be avoided. To be specific, in the present embodiment, the first pixel electrode 230 and the second pixel electrode 240 are disposed approximately in a region defined by the scan line 204 and the data line 202, namely, the first pixel electrode 230 and the second pixel electrode 240 form approximately a rectangular display region. The second pixel electrode 240 includes a central electrode block 242, a first end electrode block 244, and a second end electrode block 246. The central electrode block 242 is located between the first electrode block 232 and the second electrode block 234 so as to separate the two. The first end electrode block 244 and the second end electrode block 246 are respectively connected to two ends of the central electrode block 242. The first electrode block 232 and the second electrode block 234 are in approximately triangular shape. However, in other embodiments of the present invention, the first electrode block 232 and the second electrode block 234 may also be in rectangular shape or in other shapes.

Substantially, the first pixel electrode 230 further includes a connecting portion 236 which may be a strip-shaped metal pattern and is connected between the first electrode block 232 and the second electrode block 234. The first electrode block 232 and the second electrode block 234 may be connected through a contact hole and the connecting portion 236. Because the second pixel electrode 240 separates the first electrode block 232 and the second electrode block 234, the connecting portion 236 partially overlaps the second pixel electrode 240 and accordingly a parasitic capacitor CC is produced. One end of the connecting portion 236 is connected to the second electrode block 234 and the other end thereof is electrically coupled to the first electrode block 232 so that the first electrode block 232 and the second electrode block 234 can be electrically coupled. However, the connecting portion 236 may also be electrically connected to the first electrode block 232 directly. The first electrode block 232 and the second electrode block 234 can have the same display voltage through the connection of the connecting portion 236.

As described above, the first pixel electrode 230 and the second pixel electrode 240 are evenly distributed in the rectangular region defined by the scan line 204 and the data line 202, so that when the pixel structure 200 is applied in an LCD, display areas having different luminance are evenly distributed so that coarseness will not be felt in an image displayed by the LCD. In addition, a plurality of alignment protrusions or main slits 206 may be selectively disposed in the pixel structure 200 in order to allow the pixel structure 200 to achieve a wide-angel display. The disposition of the alignment protrusions or main slits 206 is determined according to the actual requirement; however, the present invention is not limited herein.

The design of the first pixel electrode 230 and the second pixel electrode 240 can reduce the coarseness in a displayed image and accordingly improve the display quality of the pixel structure 200. However, a driving method or capacitor design corresponding to foregoing design has to be provided in order to allow the first pixel electrode 230 and the second pixel electrode 240 to have different display voltages. In the present disclosure, a capacitor design is provided to allow the first pixel electrode 230 and the second pixel electrode 240 to have different display voltages without adopting any additional device; however, the present invention is not limited to the capacitor design.

Referring to FIG. 3A and FIG. 3B, in the pixel structure 200, the first capacitance electrode 250 and the second capacitance electrode 260 cross over the entire pixel structure 200. Part of the first pixel electrode 230 and part of the second pixel electrode 240 overlap the first capacitance electrode 250, and another part of the first pixel electrode 230 and another part of the second pixel electrode 240 overlap the second capacitance electrode 260. As a result, the first pixel electrode 230 respectively forms a first capacitor Cst1 and a second capacitor Cst2 with the first capacitance electrode 250 and the second capacitance electrode 260, and the second pixel electrode 240 respectively forms a third capacitor Cst3 and a fourth capacitor Cst4 with the first capacitance electrode 250 and the second capacitance electrode 260.

In a driving method of the pixel structure 200, an image data signal may be first provided to the first pixel electrode 230 and the second pixel electrode 240. In addition, a first voltage is provided to the first capacitance electrode 250, and a second voltage is provided to the second capacitance electrode 260, wherein the first voltage is different from the second voltage, and the difference between the two is higher than 0V and lower than 20V. The first capacitance electrode 250 and the second capacitance electrode 260 may produce coupling effect with the first pixel electrode 230 and the second pixel electrode 240 so as to produce the first capacitor Cst1, the second capacitor Cst2, the third capacitor Cst3, and the fourth capacitor Cst4.

When an LCD having the pixel structure 200 is displaying an image, the luminance of the region of the first pixel electrode 230 is affected by the first capacitor Cst1 and the second capacitor Cst2, and the luminance of the region of the second pixel electrode 240 is affected by the third capacitor Cst3 and the fourth capacitor Cst4. Thus, the first capacitor Cst1, the second capacitor Cst2, the third capacitor Cst3, and the fourth capacitor Cst4 have to be appropriately adjusted so as to allow the first pixel electrode 230 and the second pixel electrode 240 to have different display voltages when the first pixel electrode 230 and the second pixel electrode 240 are connected to the same scan line 204 and the same data line 202.

In the present embodiment, the first capacitance electrode 250 includes a main portion 252 and a plurality of branch portions 254, and the second capacitance electrode 260 also includes a main portion 262 and a plurality of branch portions 264. The main portion 252 and the branch portions 254 may form a bow-shaped pattern, and the main portion 262 and the branch portions 264 may also form a bow-shaped pattern. As shown in FIG. 3A, in the first capacitance electrode 250, the size of the branch portion 254 located at the right side of the pixel structure 200 is smaller than the size of the branch portion 254 located at the left side of the pixel structure 200, and the size of the branch portions 264 in the second capacitance electrode 260 is greater than the size of the branch portion 254 located at the left side of the pixel structure 200 in the first capacitance electrode 250; however, the present invention is not limited thereto. The branch portions 254 below the first pixel electrode 230 and the second pixel electrode 240 respectively have patterns of different sizes. Accordingly, the capacitances of the first capacitor Cst1, the second capacitor Cst2, the third capacitor Cst3, and the fourth capacitor Cst4 can be adjusted. In other words, in the present embodiment, the display voltages of the first pixel electrode 230 and the second pixel electrode 240 are adjusted by changing the sizes of the first capacitance electrode 250 and the second capacitance electrode 260.

Referring to both FIG. 3A and FIG. 3B, when the pixel structure 200 is applied in an LCD, a substrate (not shown) disposed with the pixel structure 200 is assembled with an opposite substrate (not shown) disposed with an opposite electrode 270. The pixel structure 200 is a pixel structure of positive polarity design when the display voltage of the pixel structure 200 is higher than the voltage of the opposite electrode 270, and the pixel structure 200 is a pixel structure of negative polarity design when the display voltage of the pixel structure 200 is lower than the voltage of the opposite electrode 270. In order to allow the pixel structure 200 to present different luminance, the capacitances of the first capacitor Cst1, the second capacitor Cst2, the third capacitor Cst3, and the fourth capacitor Cst4 should be adjusted according to the polarity of the pixel structure 200. Below, the pixel structure 200 will be described as a pixel structure having positive polarity design.

In the present embodiment, different voltage levels are provided to the first capacitance electrode 250 and the second capacitance electrode 260. Assuming that the coupling effect of the first capacitance electrode 250 increases the display voltage of the positive pixel structure 200 and the coupling effect of the second capacitance electrode 260 reduces the display voltage of the positive pixel structure 200, the first capacitor Cst1 should be greater than the second capacitor Cst2 in order to allow the first pixel electrode 230 to have higher display voltage, namely, to present higher luminance, and the fourth capacitor Cst4 should be greater than the third capacitor Cst3 in order to allow the second pixel electrode 240 to present lower luminance.

Thereby, the overlapped area of the first capacitance electrode 250 and the first pixel electrode 230 may be larger than the overlapped area of the second capacitance electrode 260 and the first pixel electrode 230, and the overlapped area of the first capacitance electrode 250 and the second pixel electrode 240 may be smaller than the overlapped area of the second capacitance electrode 260 and the second pixel electrode 240. Accordingly, the capacitance of the first capacitor Cst1 is greater than the capacitance of the second capacitor Cst2, and the capacitance of the third capacitor Cst3 is smaller than the capacitance of the fourth capacitor Cst4. In other words, the capacitances of the first capacitor Cst1 and the second capacitor Cst2, and the capacitances of the third capacitor Cst3 and the fourth capacitor Cst4 can be made different through different design of the overlapped areas. As a result, the first pixel electrode 230 and the second pixel electrode 240 can present different luminance.

Based on the design concept of the present embodiment, when the pixel structure 200 is a pixel structure having negative polarity design, the capacitance of the first capacitor Cst1 is smaller than the capacitance of the second capacitor Cst2, and the capacitance of the fourth capacitor Cst4 is smaller than the capacitance of the third capacitor Cst3. Thus, the branch portions 254 and 264 located below the first pixel electrode 230 and the second pixel electrode 240 are designed to have other different sizes as shown in FIG. 3A. However, the shapes and sizes of the branch portions 254 and 264 are not limited in the present invention. Substantially, the branch portions 254 and 264 can have circular, rectangular, triangular, or other geometrical shapes, and the sizes of the branch portions 254 and 264 can have different combination according to the polarity of the pixel structure 200.

Figure 4:
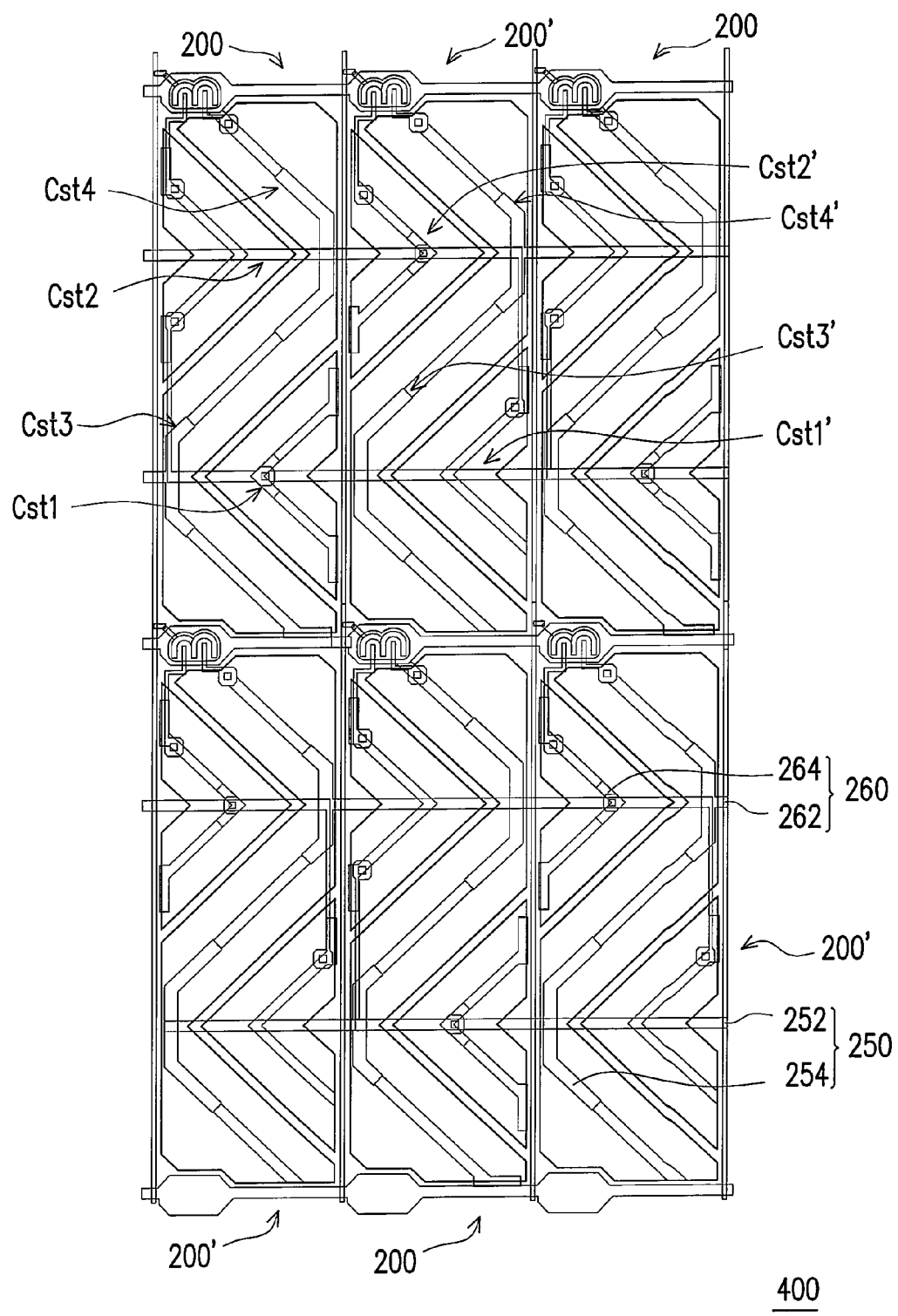
FIG. 4 is a schematic view of a pixel array structure according to an embodiment of the present invention.

FIG. 4 is a schematic view of a pixel array structure according to an embodiment of the present invention. Referring to FIG. 4, the pixel array structure 400 may be composed of a plurality of pixel structures 200 and a plurality of pixel structures 200' as described in foregoing embodiment, wherein the pixel structures 200 and 200' are arranged in a staggered way. The pixel structures 200' and the pixel structures 200 are designed to have different polarities. If the pixel structure 200' are negative, with the driving method described above, the capacitance of the first capacitor Cst1' is smaller than the capacitance of the second capacitor Cst2', and the capacitance of the fourth capacitor Cst4' is smaller than the capacitance of the third capacitor Cst3'. Thus, the branch portions 254 and 264 in the first capacitance electrode 250 and the second capacitance electrode 260 of the pixel structures 200' present different distribution as those in the first capacitance electrode 250 and the second capacitance electrode 260 of the pixel structures 200. As shown in FIG. 4, the size of the branch portion 264 of the second capacitance electrode 260 corresponding to the fourth capacitor Cst4' in the pixel structure 200' is different from the size of the branch portion 264 of the second capacitance electrode 260 corresponding to the fourth capacitor Cst4 in the pixel structure 200.

Figure 5A:
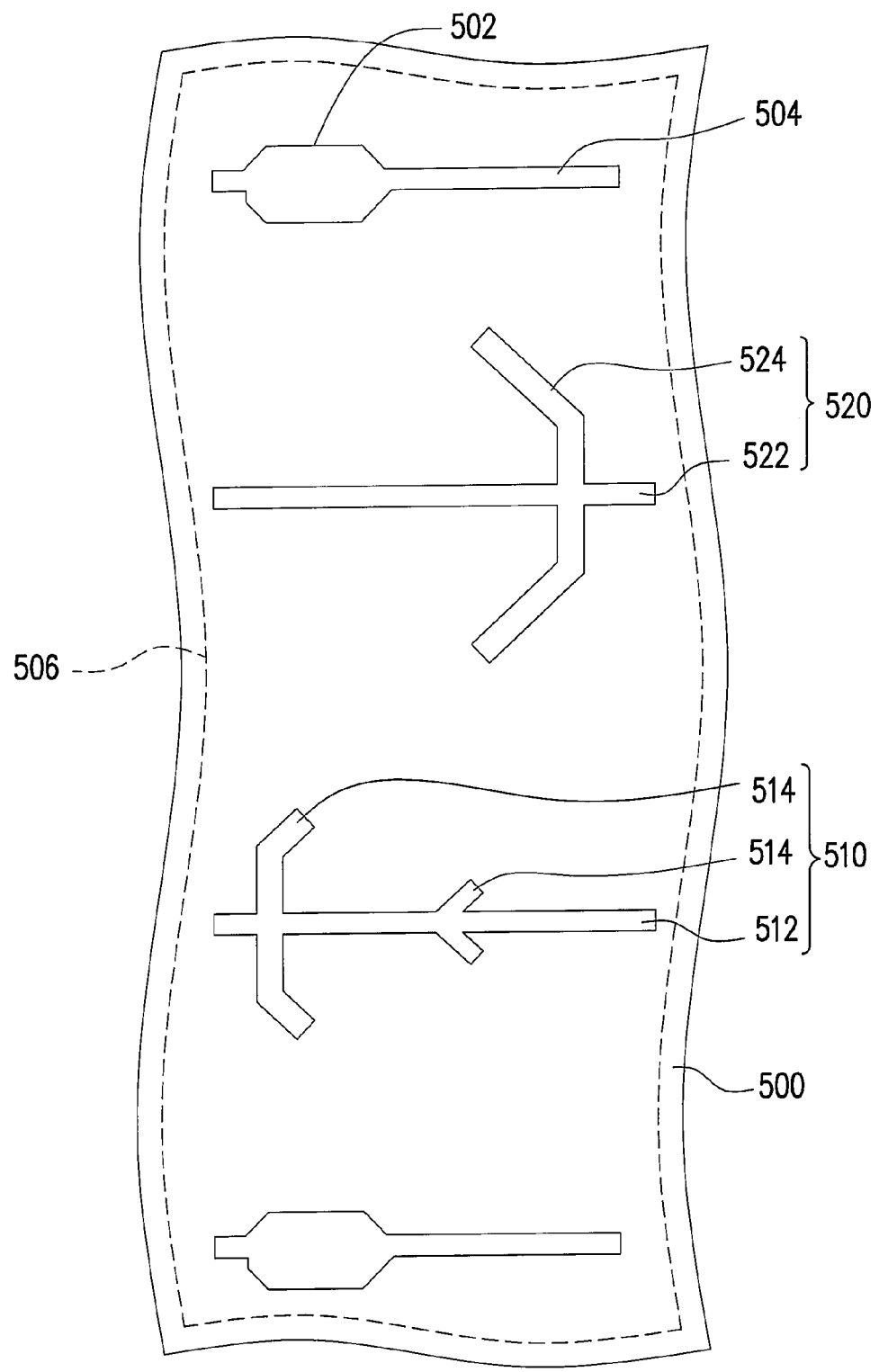
FIGS. 5A~5D illustrate a manufacturing method of a pixel structure according to an embodiment of the present invention.

FIGS. 5A~5D illustrate a manufacturing method of a pixel structure according to an embodiment of the present invention. Referring to FIG. 5A, first, a gate 502, at least one scan line 504, a first capacitance electrode 510, and a second capacitance electrode 520 are formed on a substrate 500 with a conductive material. The first capacitance electrode 510 includes a main portion 512 and a plurality of branch portions 514, and the second capacitance electrode 520 also includes a main portion 522 and a plurality of branch portions 524. The conductive material may be a metal, an alloy, or a plurality of metal layers. In addition, a gate insulation layer 506 is formed on the substrate 500 for covering the gate 502, the scan line 504, the first capacitance electrode 510, and the second capacitance electrode 520.

Figure 5B:
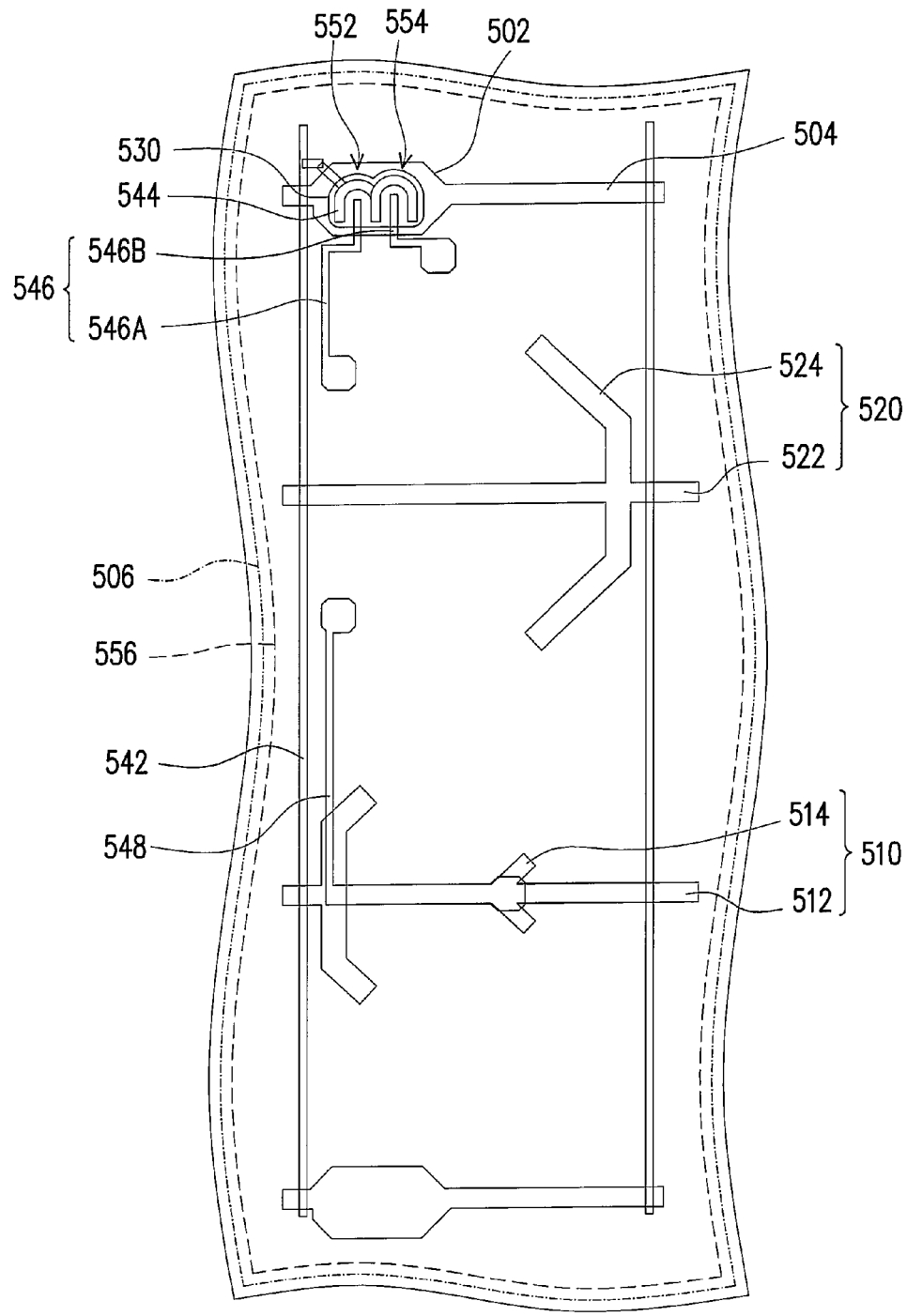

Next, referring to FIG. 5B, a semiconductor layer 530, a data line 542, a source 544, a drain 546, and a connecting portion 548 are formed on the gate insulation layer 506. The semiconductor layer 530 may be made of a semiconductive material and is disposed above the gate 502. The data line 542, the source 544, the drain 546, and the connecting portion 548 are made of a conductive material such as a metal, an alloy, or a plurality of metal layers etc. In addition, the connecting portion 548 may also be made of a transparent conductive material. The data line 542 and the scan line 504 intersect with each other, and the source 544 and the drain 546 are disposed on the semiconductor layer 530. The drain 546 includes a first drain 546A and a second drain 546B. The connecting portion 548 is located within a region defined by the scan line 504 and the data line 542, and part of the connecting portion 548 is located above the first capacitance electrode 510. In the present embodiment, the gate 502, the source 544, and the first drain 546A may form a first active device 552, and the gate 502, the source 544, and the second drain 546B may form a second active device 554. Additionally, a passivation layer 556 may be further disposed on the data line 542, the first active device 552, and the second active device 554.

Figure 5C:
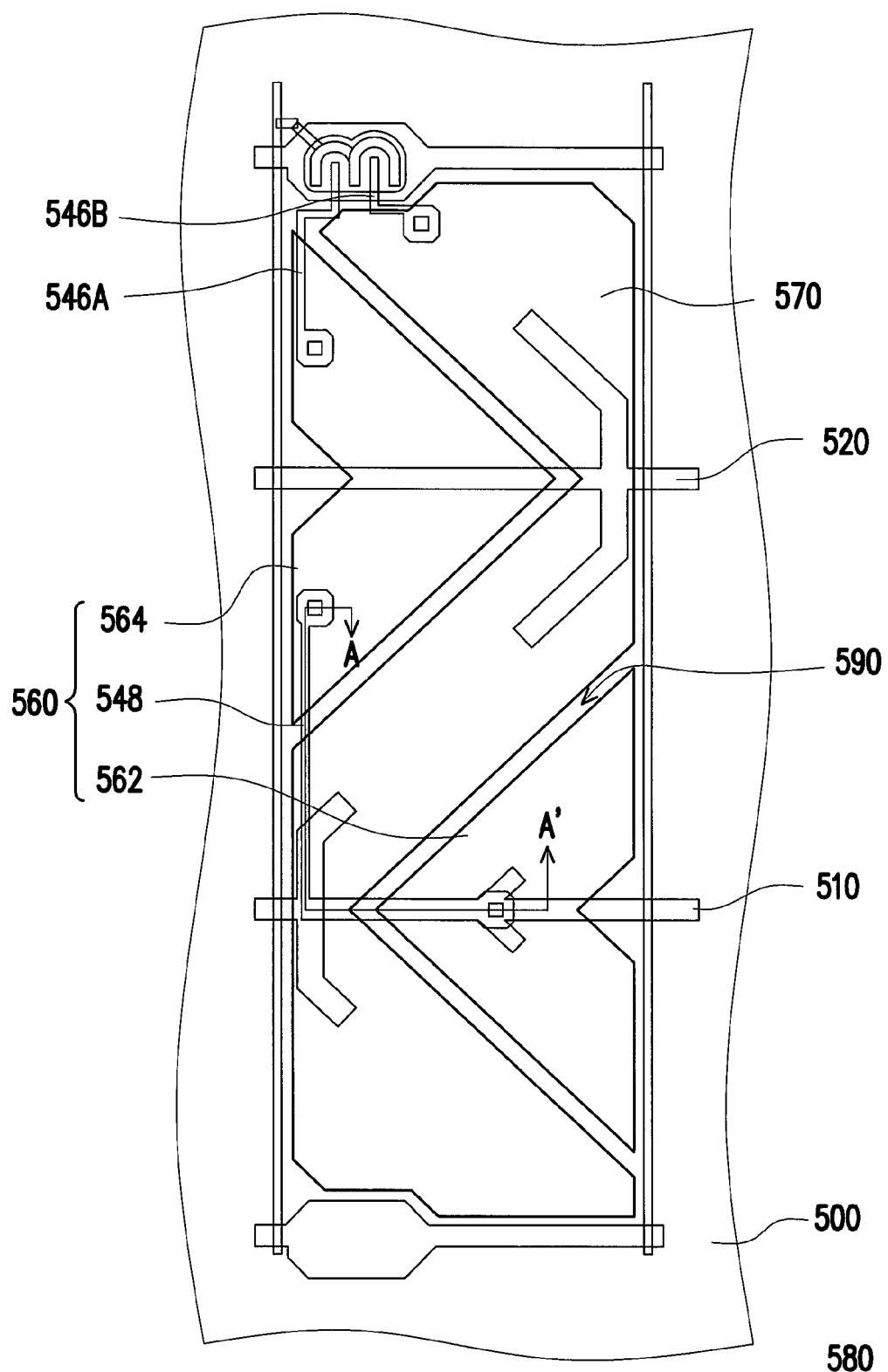
Figure 5D:
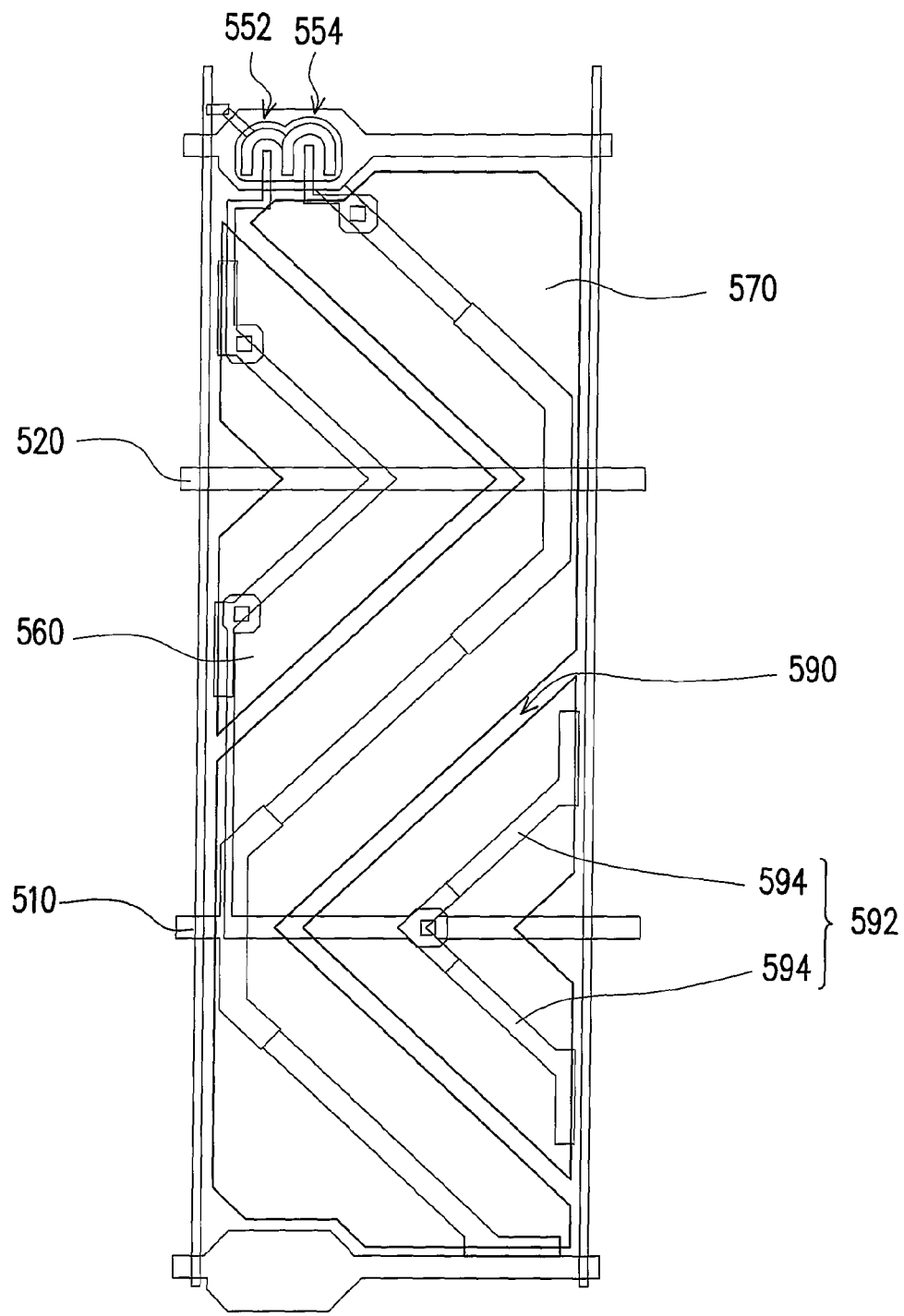
Figure 5E:
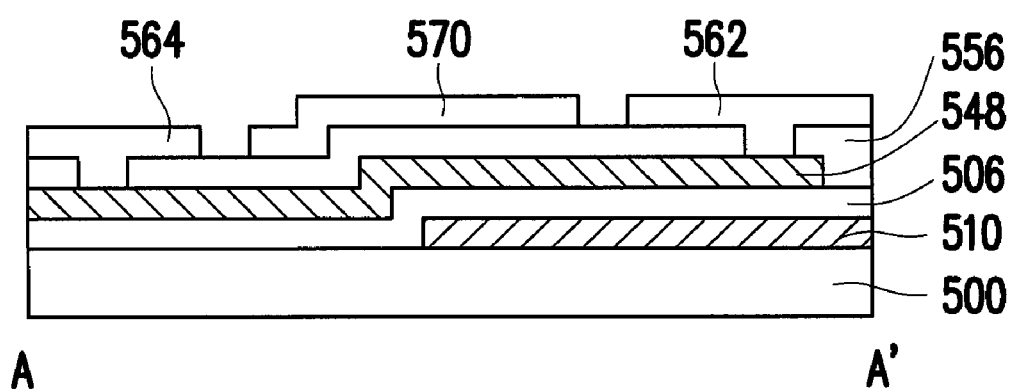
FIG. 5E is a cross-sectional view along cross-sectional line A-A' in FIG. 5C.

After that, referring to FIG. 5C, a first electrode block 562, a second electrode block 564, and a second pixel electrode 570 are formed on the substrate 500 with a transparent conductive material, and by now the manufacturing of a pixel structure 580 is completed. The transparent conductive material may be indium tin oxide (ITO) or indium zinc oxide (IZO). The first electrode block 562 and the second electrode block 564 may be in triangular shape, and the connecting portion 548 is connected to the second electrode block 564. The first electrode block 562 is electrically coupled with the second electrode block 564 through the connecting portion 548. The first electrode block 562, the connecting portion 548, and the second electrode block 564 form a first pixel electrode 560. Besides, the first drain 546A is electrically connected to the first pixel electrode 560, and the second drain 546B is electrically connected to the second pixel electrode 570. As seen in FIG. 5E, the connecting portion 548 is disposed between the first electrode block 562 and the second electrode block 564, and electrically connects the first electrode block 562 and the second electrode block 564.

Substantially, the first electrode block 562 and the second electrode block 564 are in approximately triangular shape or other geometrical shapes, and the second pixel electrode 570 separates the first electrode block 562 and the second electrode block 564. Besides, the first pixel electrode 560 is electrically insulated from the second pixel electrode 570. Part of the first pixel electrode 560 overlaps the first capacitance electrode 510, and another part of the first pixel electrode 560 overlaps the second capacitance electrode 520. Similarly, part of the second pixel electrode 570 overlaps the first capacitance electrode 510, and another part of the second pixel electrode 570 overlaps the second capacitance electrode 520. These overlapped areas form a plurality of capacitors which affect the voltages of the first pixel electrode 560 and the second pixel electrode 570 and accordingly improve the display quality of the pixel structure 580.

Figure 6:
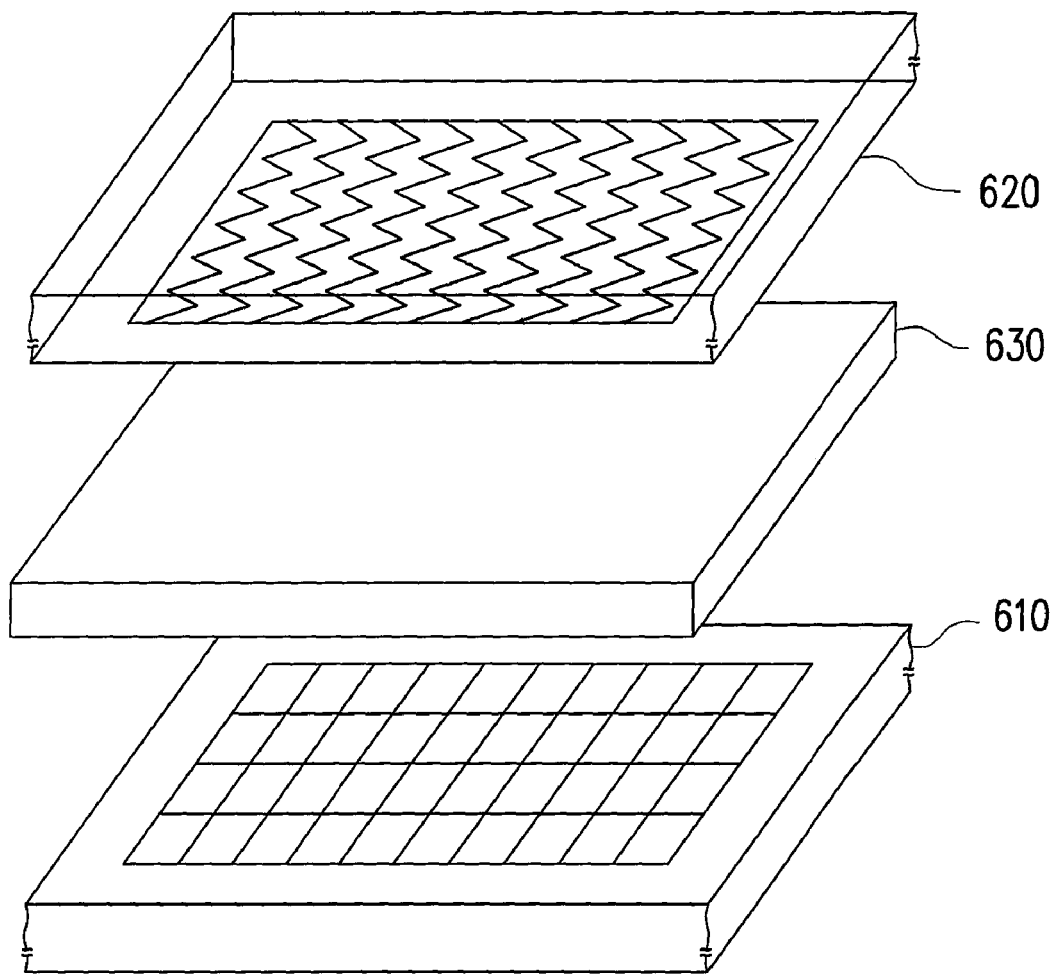
FIG. 6 illustrates an LCD panel applying the technique provided by the present invention.

A plurality of V-shaped slits 590 is located between the first pixel electrode 560 and the second pixel electrode 570. In order to allow the pixel structure 580 to achieve a wide-angle display, the step in FIG. 5D can be executed to form a plurality of alignment protrusions or main slits 592 in the pixel structure 580. For the present embodiment, if the alignment is controlled by alignment protrusions, the alignment protrusions are located on the opposite substrate (not shown), as shown in FIG. 5D, but if the alignment is controlled by alignment slits, the slits are formed with the pixel electrodes. The alignment protrusions or main slits 592 may be composed of strip patterns 594 which form V-shaped patterns similar to the slits 590. As shown in FIG. 6, the alignment protrusions or main slits 592 may be formed on an opposite substrate 620 of the LCD panel 60, wherein the opposite substrate 620 may be a color filter substrate. Whether the alignment protrusions or main slits 592 are formed is not restricted by the present invention. In addition, the alignment protrusions or main slits 592 may be disposed in the first pixel electrode 560 and the second pixel electrode 570. In the pixel structure 580, the regions of first pixel electrode 560 and the second pixel electrode 570 can present different luminance through the capacitance coupling effect thereof with the first capacitance electrode 510 and the second capacitance electrode 520. Meanwhile, the first pixel electrode 560 and the second pixel electrode 570 are evenly distributed in the pixel structure 580 so that color shift at large viewing angles is reduced and coarseness in images displayed by the pixel structure 580 is avoided. As a result, the display quality of the pixel structure 580 is improved. It should be mentioned here that the pixel structure 580 can have a design as any one of the pixel structures 200 and 200' described in foregoing embodiments or any other pixel structure within the scope of the present invention.

FIG. 6 illustrates an LCD panel 60 applying the technique provided by the present invention. The LCD panel 60 includes an opposite substrate 620, an array substrate 610, and a liquid crystal layer 630. The opposite substrate 620 and the array substrate 610 are disposed opposite to each other, and the liquid crystal layer 630 is disposed between the opposite substrate 620 and the array substrate 610. The opposite substrate 620 may be a color filter substrate, and the array substrate 610 includes a plurality of pixel structures or a pixel array structure as described in foregoing embodiments.

In overview, according to the present invention, a first pixel electrode and a second pixel electrode are evenly distributed in a pixel structure in a staggered way, and meanwhile, the regions of the first pixel electrode and the second pixel electrode present different luminance. Thus, when the pixel structure and pixel array structure provided by the present invention is provided in an LCD, color shift produced at large viewing angles can be reduced and coarseness in images displayed by the LCD caused by uneven luminance can be avoided. In other words, the pixel structure in the present invention offers good display quality. Moreover, in the present invention, the voltages of the first pixel electrode and the second pixel electrode can be adjusted or affected by simply adjusting the pattern of the capacitance electrodes. Accordingly, a good display quality can be achieved by the pixel structure and the pixel array structure provided by the present invention without any complicated driving method or additional device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel structure, electrically connected to a data line and a scan line, the pixel structure comprising:
    a first active device, electrically connected to the data line and the scan line;
    a second active device, electrically connected to the data line and the scan line;
    a first pixel electrode, electrically connected to the first active device, the first pixel electrode comprising a first electrode block and a second electrode block electrically connected to each other;
    a second pixel electrode, electrically connected to the second active device, the second pixel electrode being electrically insulated from the first pixel electrode, and the second pixel electrode separating the first electrode block and the second electrode block;
    a first capacitance electrode; and
    a second capacitance electrode, a first overlapping region between the first pixel electrode and the first capacitance electrode forming a first capacitor, a second overlapping region between the first pixel electrode and the second capacitance electrode forming a second capacitor, a third overlapping region between the second pixel electrode and the first capacitance electrode forming a third capacitor, a fourth overlapping region between the second pixel electrode and the second capacitance electrode forming a fourth capacitor, wherein an overlapping area of first overlapping region is different from that of the second overlapping region such that the first capacitor and the second capacitor have different capacitances, and an overlapping area of third overlapping region is different from that of the fourth overlapping region such that the third capacitor and the fourth capacitor have different capacitances.

2. The pixel structure according to claim 1, wherein the capacitance of the first capacitor is greater than the capacitance of the second capacitor.

3. The pixel structure according to claim 1, wherein the capacitance of the third capacitor is smaller than the capacitance of the fourth capacitor.

4. The pixel structure according to claim 1, wherein the capacitance of the first capacitor is smaller than the capacitance of the second capacitor.

5. The pixel structure according to claim 1, wherein the capacitance of the third capacitor is greater than the capacitance of the fourth capacitor.

6. The pixel structure according to claim 1, wherein the first pixel electrode further comprises a connecting portion disposed between the first electrode block and the second electrode block, and electrically connecting the first electrode block and the second electrode block.

7. The pixel structure according to claim 6, wherein the material of the connecting portion is a metal or a transparent conductive material.

8. The pixel structure according to claim 1, wherein the first electrode block and the second electrode block are in triangular or rectangular shape.

9. The pixel structure according to claim 1, wherein the second pixel electrode comprises a central electrode block, and a first end electrode block and a second end electrode block respectively connected to two ends of the central electrode block, and the central electrode block is disposed between the first electrode block and the second electrode block of the first pixel electrode.

10. A driving method for driving a pixel structure as claimed in claim 1, the driving method comprising:
providing a first voltage to the first capacitance electrode; and
providing a second voltage to the second capacitance electrode, wherein the first voltage is different from the second voltage so that the luminance in the region of the first pixel electrode is made different from the luminance in the region of the second pixel electrode.

11. The driving method according to claim 10, wherein the difference between the first voltage and the second voltage is higher than 0V and lower than 20V.

12. The driving method according to claim 10, further comprising providing an image data signal to the first pixel electrode and the second pixel electrode.

13. A liquid crystal display (LCD) panel, comprising:
an array substrate, comprising a plurality of pixel structures as claimed in claim 1;
an opposite substrate, disposed opposite to the array substrate; and
a liquid crystal layer, disposed between the array substrate and the opposite substrate.

14. A pixel structure, electrically connected to a data line and a scan line, the pixel structure comprising:
a first active device, electrically connected to the data line and the scan line;
a second active device, electrically connected to the data line and the scan line;
a first pixel electrode, electrically connected to the first active device, the first pixel electrode comprising a first electrode block and a second electrode block electrically connected to each other;
a second pixel electrode, electrically connected to the second active device, the second pixel electrode being electrically insulated from the first pixel electrode, and the second pixel electrode separating the first electrode block and the second electrode block;
a first capacitance electrode having a first main portion and a plurality of first branch portions; and
a second capacitance electrode having a second main portion and a plurality of second branch portions, the first pixel electrode and a part of first branch portions of the first capacitance electrode forming a first capacitor, the first pixel electrode and a part of second branch portions of the second capacitance electrode forming a second capacitor, the second pixel electrode and another part of first branch portions of the first capacitance electrode forming a third capacitor, the second pixel electrode and another part of second branch portions of the second capacitance electrode forming a fourth capacitor, wherein a size of said part of first branch portions of the first capacitance electrode and a size of said part of second branch portions of the second capacitance electrode are different such that the first capacitor and the second capacitor have different capacitances, and a size of said another part of first branch portions of the first capacitance electrode and a size of said another part of second branch portions of the second capacitance electrode are different such that the third capacitor and the fourth capacitor have different capacitances.

15. A pixel structure having a right side and a left side, electrically connected to a data line and a scan line, the pixel structure comprising:
a first active device, electrically connected to the data line and the scan line;
a second active device, electrically connected to the data line and the scan line;
a first pixel electrode, electrically connected to the first active device, the first pixel electrode comprising a first electrode block and a second electrode block electrically connected to each other;
a second pixel electrode, electrically connected to the second active device;
a first capacitance electrode having a first main portion and a plurality of first branch portions; and
a second capacitance electrode having a second main portion and a plurality of second branch portions, the first pixel electrode and a part of first branch portions of the first capacitance electrode forming a first capacitor, the first pixel electrode and a part of second branch portions of the second capacitance electrode forming a second capacitor, the second pixel electrode and another part of first branch portions of the first capacitance electrode forming a third capacitor, the second pixel electrode and another part of second branch portions of the second capacitance electrode forming a fourth capacitor, wherein a size of said first branch portion at the right side is small than that of said first branch portion at the left side.

16. The pixel structure according to claim 15, wherein a size of the second branch portion is greater than that of the first branch portion at the left side.

* * * * *